(12) United States Patent
Hon

(10) Patent No.: US 9,573,345 B2
(45) Date of Patent: Feb. 21, 2017

(54) COMPOSITE OF METAL AND RESIN AND METHOD FOR MANUFACTURING SAME

(71) Applicant: HON HAI PRECISION INDUSTRY CO., LTD., New Taipei (TW)

(72) Inventor: Kar-Wai Hon, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 194 days.

(21) Appl. No.: 14/515,935

(22) Filed: Oct. 16, 2014

(65) Prior Publication Data

US 2015/0118479 A1   Apr. 30, 2015

(30) Foreign Application Priority Data

Oct. 24, 2013   (CN) .......................... 2013 1 0503354

(51) Int. Cl.
| | |
|---|---|
| *B32B 15/08* | (2006.01) |
| *C23F 4/00* | (2006.01) |
| *B32B 3/26* | (2006.01) |
| *B29C 45/14* | (2006.01) |
| *B29K 705/00* | (2006.01) |

(52) U.S. Cl.
CPC ......... *B32B 15/08* (2013.01); *B29C 45/14311* (2013.01); *B32B 3/26* (2013.01); *B29K 2705/00* (2013.01); *B32B 2250/02* (2013.01); *B32B 2457/00* (2013.01); *Y10T 428/24997* (2015.04)

(58) Field of Classification Search
None
See application file for complete search history.

(56) References Cited

U.S. PATENT DOCUMENTS

| 5,811,019 A * | 9/1998 | Nakayama ............... B41J 2/162 216/27 |
| 2002/0172799 A1* | 11/2002 | Subramanian ...... C23C 28/3215 428/116 |
| 2008/0078522 A1* | 4/2008 | Kim ...................... B22D 17/24 164/302 |
| 2011/0011827 A1* | 1/2011 | Lee ................... A61M 37/0015 216/11 |
| 2012/0207982 A1* | 8/2012 | Aso ..................... B29C 45/0005 428/164 |

FOREIGN PATENT DOCUMENTS

| CN | 102442028 A | 5/2012 |
| JP | 2009051131 A | 3/2009 |

* cited by examiner

*Primary Examiner* — Shamim Ahmed
(74) *Attorney, Agent, or Firm* — Zhigang Ma

(57) ABSTRACT

A composite of metal and resin is provided. The composite of metal and resin includes a metal piece and a resin piece, and the surface of the metal piece includes a number of micropores. Each micropore includes a first inclining hole and a second inclining hole, and the first inclining hole and the second inclining hole are disposed inclined with the surface of the metal piece. The first inclining hole and the second inclining hole are disposed symmetrical around an axis perpendicular to the surface of the metal piece, and communicate with each other on the surface of the metal piece. The resin piece is embedded to the micropores to combine with the metal piece. The bonding strength of the composite of metal and resin is increased. A method of manufacturing the composite of metal and resin is also provided.

5 Claims, 6 Drawing Sheets

COMPOSITE OF METAL AND RESIN AND METHOD FOR MANUFACTURING SAME

FIELD

This disclosure relates to a composite of metal and resin that is composed of a metal and a resin composition suitable for casings of electronic devices, housings of home electric appliances, structural components, machinery parts, for example, and also to a method for manufacturing the composite.

BACKGROUND

Composites of metal and resin are used in a wide range of industrial fields. Generally, the metal and the resin are joined together by adhesive, and more recently a new method of injection joining for manufacturing composites of metal and resin has been used. In this method, a molten resin material is injected onto a metal piece that has been inserted in advance into an injection molding mold. The metal piece has a surface combined with the resin. Generally, before inserting the metal piece in the mold, a surface of the metal piece is treated by an etchant to form a number of micropores so that a stronger bond is formed with the resin material.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
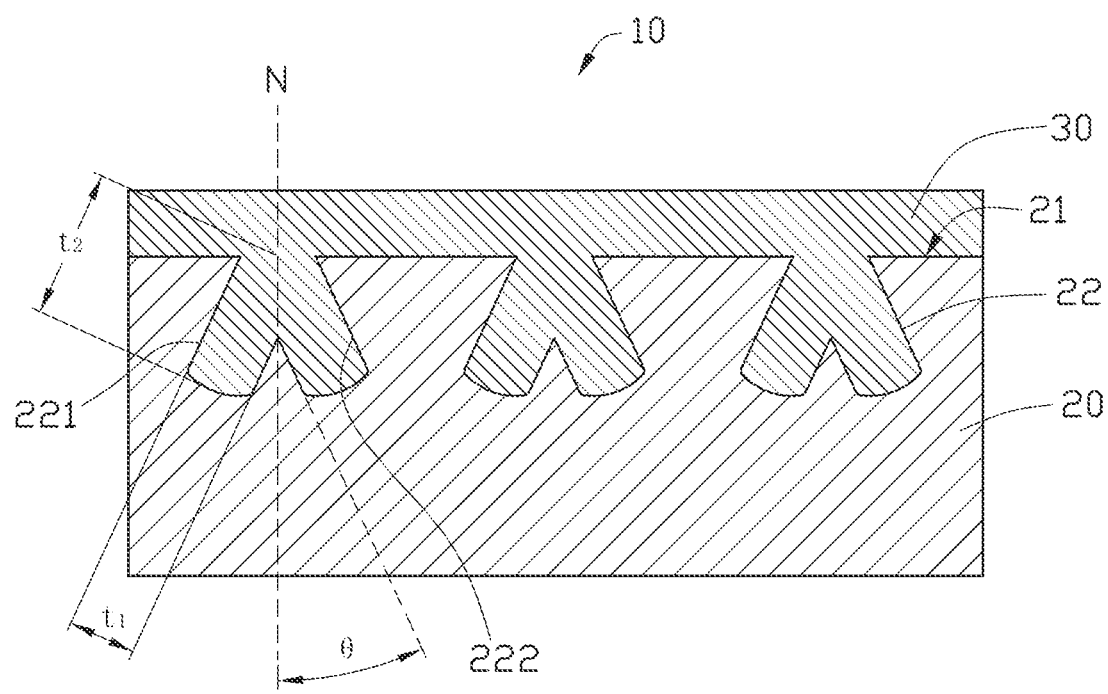
FIG. 1 is a cross-sectional view of a composite of metal and resin, in accordance with an exemplary embodiment.

This disclosure is illustrated by way of example and not by way of limitation in the figures of the accompanying drawings in which like reference numerals indicate similar elements. It should be noted that references to "an" or "one" embodiment in this disclosure are not necessarily to the same embodiment, and such references mean "at least one".

FIG. 1 illustrates an exemplary embodiment of a composite 10 of metal and resin. The composite 10 can include a metal piece 20 and a resin piece 30.

The metal piece 20 can include a surface 21 defining a plurality of micropores 22. The micropores 22 can be V-shaped, and each micropore 22 can include a first inclining hole 221 and a second inclining hole 222 which incline with the surface 21 of the metal piece 20. The first inclining hole 221 and the second inclining hole 222 can be arranged symmetrically around an N-axis substantially perpendicular to the surface 21 of the metal piece 20. The first inclining hole 221 and the second inclining hole 222 communicate with each other on the surface 21 of the metal piece 20. The material of the metal piece 20 can be selected from the group consisting of aluminum alloy, magnesium alloy, stainless steel alloy, copper and copper alloy.

In the illustrated embodiment, the first inclining hole 221 and the second inclining hole 222 can be sloped at an angle $\theta$ with the N-axis, and the angle $\theta$ can be in a range from about 15 degrees to about 45 degrees. The micropores 22 can be positioned in an array. In other embodiments, the micropores 22 can be positioned at random.

A diameter of the first inclining hole 221 and the second inclining hole 222 can be defined as t1, and a depth of the first inclining hole 221 and the second inclining hole 222 can be defined as t2. In one embodiment, t1 can be in a range from about 100 nanometer (nm) to about 300 nm, and a breadth depth ratio (t1/t2) can be in a range from about 1:3 to about 1:5.

The resin piece 30 is bonded to the metal piece 20 by inserting molten resin material into a mold holding the metal piece 20, wherein the molten resin material is partially embedded into the micropores 22. The resin material is a crystallized-type resin and crystallizes when as it cools. The crystallized-type thermoplastic resin material can be selected from the group consisting of a composite of polyphenylene sulfide and glass fiber, polyamide, polyethylene terephthalate, or polybutylene terephthalate. When using the polyphenylene sulfide and glass fiber composite, the percentage composition of the glass fiber is in a range from 20 percent to 50 percent.

Each micropore 22 can include the first inclining hole 221 and the second inclining hole 222. When an external force is applied to separate the metal piece 20 and the resin piece 30, the external force is divided to a first force parallel to the bottom of the second inclining hole 222 and a second force vertical to the bottom of the first inclining hole 221. Therefore, the composite 10 of this disclosure can have a larger sliding friction than the conventional composite including vertical micropores, allowing an increased bonding strength.

FIG. 2 through FIG. 6 illustrate an exemplary method for manufacturing a composite 10 of metal and resin.

Figure 2:
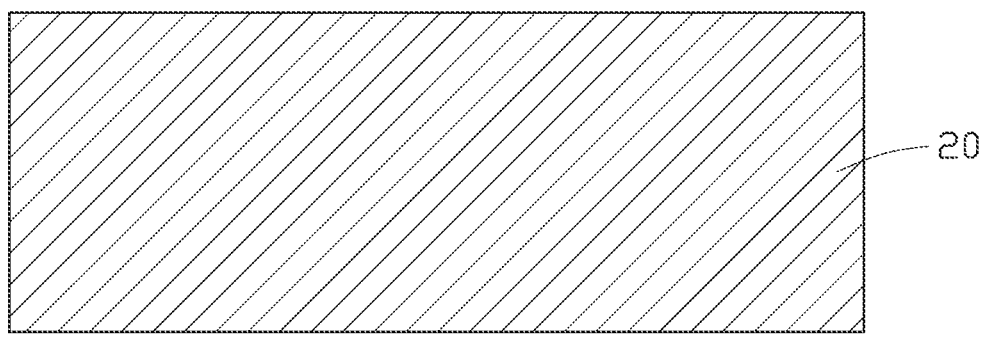
FIG. 2 through FIG. 6 are cross-sectional views of an exemplary process for manufacturing the composite of metal and resin shown in FIG. 1.

FIG. 2 illustrates that the metal piece 20, after being shaped, can be provided and can be cleaned with a degreasing agent solution. Any process, such as machining or casting, can form the metal piece 20.

The metal piece 20 can be immersed in the solution having a temperature in an approximate range from 20° C. to 30° C. for 1 minute to 6 minutes. The concentration of degreasing agent contained in the solution can be in an approximate range of 90 grams/liter (g/l) to 150 grams/liter (g/l). The metal piece 20 is washed with distilled water after removal from the solution.

Figure 3:
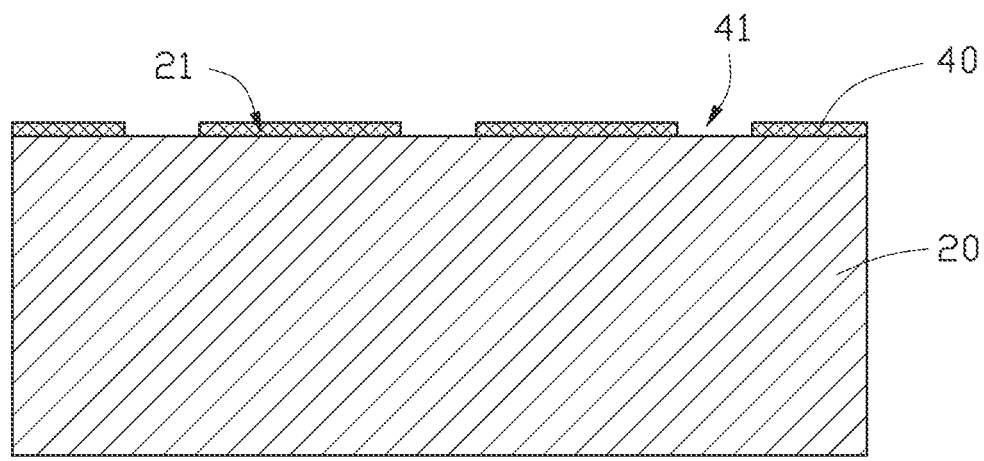

FIG. 3 illustrates that a photoresist layer 40 with a plurality of openings 41 can be formed on the surface 21 of the metal piece 20. In one embodiment, the openings 41 can be substantially circular and arranged in an array. In other embodiments, the openings 41 can be substantially square or other shapes. The openings 41 can be through holes or blind holes in the photoresist layer 40. A diameter of the opening 41 can be in a range from about 100 nm to about 300 nm.

Figure 4:
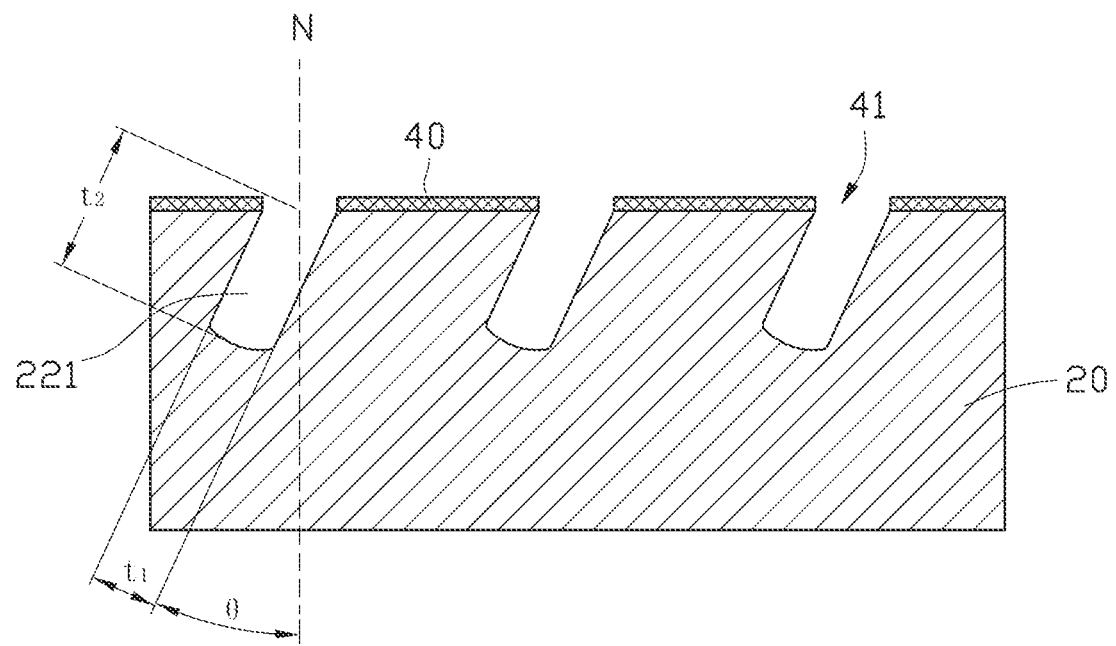

FIG. 4 illustrates that a plurality of first inclining holes 221 can be formed on the surface 21 of the metal piece 20 by plasma etching, and the first inclining holes 221 can be arranged inclined with the surface 21.

In detail, the first inclining holes 221 can be formed by a first plasma etching process with the photoresist layer 40 as a mask. The first plasma etching process can be an isometric plasma etching process applied to the surface 21. The first inclining holes 221 can be formed below the openings 41. The plasma can be argon gas or other gases. An etching direction of the plasma can be sloped at an tilt angle with the N-axis, and the tilt angle can be in a range from about 5 degrees to 75 degrees.

In one embodiment, the first inclining hole 221 can be sloped at the angle θ with the N-axis, and the angle θ can be in a range from about 15 degrees to about 45 degrees. The diameter of first inclining hole 221 is t1, and the depth of the first inclining hole 221 is t2. In one embodiment, t1 can be in a range of about 100 nm to about 300 nm, and a breadth depth ratio of the first inclining hole 221 can be in a range of about 1:3 to about 1:5.

Figure 5:
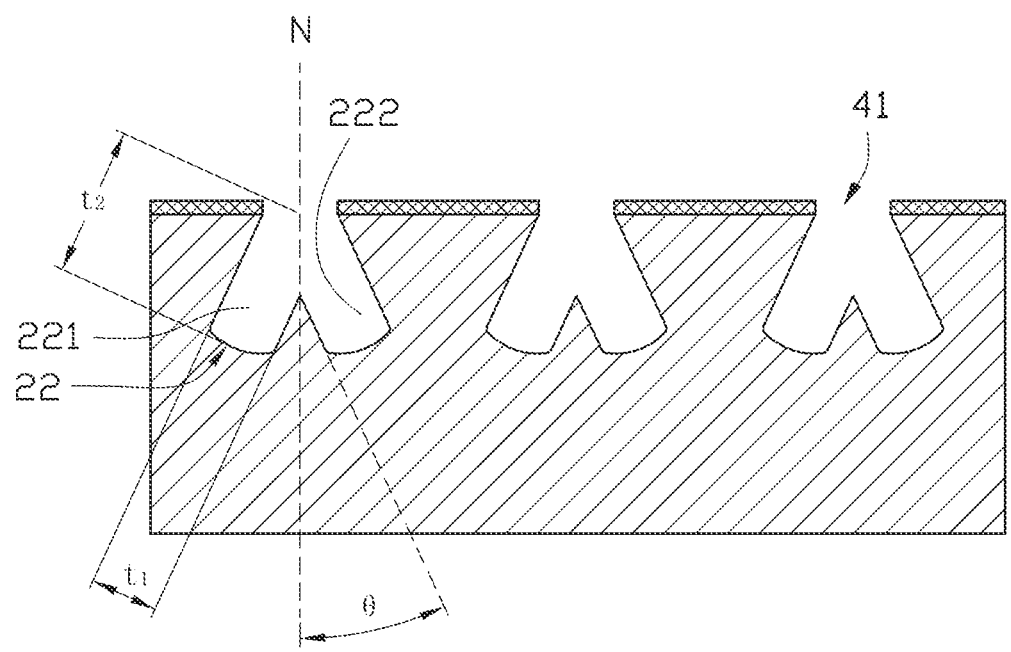

FIG. 5 illustrates that a plurality of second inclining holes 222 can be formed on the surface 21 of the metal piece 20 by plasma etching, the first inclining hole 221 and the second inclining hole 222 can be disposed symmetrically around the N-axis, and communicate with each other on the surface 21 to form the micropore 22.

In detail, the second inclining holes 222 can be formed by a second plasma etching process with the photoresist layer 40 as a mask. The second plasma etching process can be an isometric plasma etching process applied to the surface 21. The second inclining holes 222 can be formed below the openings 41. The plasma can be argon gas or other gases. An etching direction of the plasma can be sloped at a tilt angle with the N axis, and the tilt angle can be in a range from about 5 degrees to 75 degrees.

In one embodiment, the second inclining hole 222 can be sloped at the angle θ with the N axis, and the angle θ can be in a range of about 15 degrees to about 45 degrees. The diameter of second inclining hole 222 is t1, and the depth of the second inclining hole 222 is t2. In one embodiment, t1 can be in a range from about 100 nm to about 300 nm, and the breadth depth ratio of the second inclining hole 222 can be in a range from about 1:3 to about 1:5. The second inclining hole 222 has a shape substantially similar to the first inclining hole 221.

Figure 6:
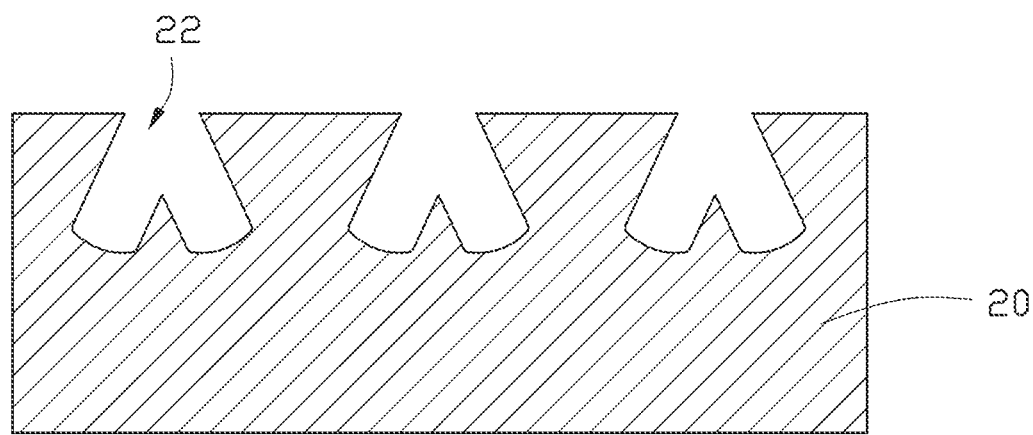

FIG. 6 illustrates that the photoresist layer 40 can be removed. The metal piece 20 can be inserted into a mold (not shown), and can be heated to a temperature in a range from 100° C. to 350° C. The heating can be accomplished using electromagnetic induction.

FIG. 1 illustrates the composite 10 of metal and resin. Molten resin material 30 is injected into the mold and onto the metal piece 20. The resin material 30 can be crystallized-type thermoplastic resin. The molten resin material 30 becomes partially embedded in the micropores 22 and bonds with the metal piece 20 when the resin material 30 is cooled. The crystallized-type thermoplastic resin material can be selected from the group consisting of a composite of polyphenylene sulfide and glass fiber, polyamide, polyethylene terephthalate, or polybutylene terephthalate. When using the polyphenylene sulfide and glass fiber composite, the percentage composition of the glass fiber is in a range from 20 percent to 50 percent.

The composite 10 of metal and resin can include a plurality of micropores 22 on the surface 21 of the metal piece 20, and each micropore 22 can include the first inclining hole 221 and the second inclining hole 222. When the resin material 30 is embedded in the micropore 22 on the surface 21 of the metal piece 20, the combination strength between the resin and the metal is increased. The method of manufacturing the composite of resin and other material 10 does not need trong acids or alkalis, so the method is more environmentally friendly than the conventional method. Furthermore, the method can be processed under normal pressure, and the difficulty of processing is reduced, therefore, the method is more suitable for mass production.

It is believed that the present embodiments and their advantages will be understood from the foregoing description, and it will be apparent that various changes can be made thereto without departing from the spirit and scope of the embodiments or sacrificing all of its material advantages.

What is claimed is:

1. A method of manufacturing the composite of metal and resin, comprising:
   providing a shaped metal piece and cleaning the metal piece with a degreasing agent solution;
   forming a photoresist layer with a plurality of openings on a surface of the metal piece;
   forming a plurality of first inclined holes through the surface of the metal piece, wherein the first inclined holes are arranged inclined with the surface of the metal piece;
   forming a plurality of second inclined holes through the surface of the metal piece, wherein the first inclined hole and the second inclined hole are arranged symmetrically around an axis perpendicular to the surface and communicate with each other on the surface to cooperatively form a micropore, thereby the plurality of first inclined holes and the plurality of second inclined holes form a plurality of micropores;
   removing the photoresist layer;
   inserting and heating the metal piece in an injection mold; and
   injecting molten resin piece on the metal piece, the resin piece is embedded to the plurality of micropores to combine with the metal piece as the resin piece cools.

2. The method as claimed in claim 1, wherein the first inclined holes and the second inclined holes are formed by isotropic plasma etching.

3. The method as claimed in claim 1, wherein diameters of the first hole and the second inclined hole are in a range of about 100 nm to about 500 nm, and breadth depth ratios of the first inclined hole and the second inclined hole are in a range of about 1:3 to about 1:5.

4. The method as claimed in claim 1, wherein the material of the metal piece is selected from the group consisting of aluminum alloy, magnesium alloy, stainless steel alloy, copper and copper alloy.

5. The method as claimed in claim 1, wherein the resin material is crystallized-type thermoplastic resin.

* * * * *